Dec. 12, 1961  H. R. HAWKES  3,012,651
APPARATUS FOR ORIENTING AND FEEDING ARTICLES
Filed Aug. 18, 1959  2 Sheets-Sheet 1

*INVENTOR.*
*HAROLD R. HAWKES*
BY
ATTORNEY.

INVENTOR.
HAROLD R. HAWKES
BY
ATTORNEY

United States Patent Office 3,012,651
Patented Dec. 12, 1961

3,012,651
APPARATUS FOR ORIENTING AND
FEEDING ARTICLES
Harold R. Hawkes, Lynnfield, Mass., assignor to Sylvania Electric Products Inc., a corporation of Delaware
Filed Aug. 18, 1959, Ser. No. 834,500
4 Claims. (Cl. 198—33)

This invention relates to article conveying or feeding apparatus. More particularly, it is concerned with apparatus for automatically supplying articles from a bulk, random association and presenting them at a point one at a time and uniformly oriented at a predetermined attitude.

One well known type of apparatus for feeding articles from bulk is the vibratory bowl feeder which includes a circular bowl having a spiral ramp or track leading from the bottom of the bowl up its internal wall to a point of discharge from the bowl near the top of the bowl. The bowl is oscillated about a vertical axis in such a manner as to impart a cyclical movement to articles placed in random distribution in the bowl and to cause the articles to advance along the ramp. A series of gates, stops, cams, guides, and other mechanical orienting arrangements are commonly placed along the ramp to permit only articles having the desired orientation to be delivered at the discharge point in one at a time relationship. Articles not properly oriented are either reoriented or are forced off the track back into the reservoir or central portion of the feeder bowl by the orienting devices.

The configuration of the articles being fed and the attitude at which they are to be oriented determine the design of the orienting arrangements. Frequently intricate and complicated arrangements of gates, cams, guides, and other orienting mechanisms are required. These mechanical arrangements may be exceptionally difficult to fabricate, arrange along the ramp, and maintain properly adjusted. In addition they are prone to jamming in the event that a non-standard or defective article is inadvertently introduced into the bowl. Even relatively simple items, for example cup-shaped articles, are frequently not conducive to the design of uncomplicated mechanical devices for performing the orientation.

Therefore, it is an object of the invention to provide an improved apparatus for feeding and orienting articles.

It is a more specific object of the invention to provide a simple, uncomplicated vibratory feeding apparatus for automatically feeding and orienting cup-shaped articles.

Briefly, in accordance with the objects of the invention, apparatus is provided which includes a track along which articles are advanced. Means are provided for rejecting from the track all advancing articles except those advancing in single file and in a single tier. Fluid means reject all articles from the track which are not oriented at a predetermined attitude. Specifically, streams or jets of air are appropriately directed with reference to the track at various positions therealong in order to remove articles advancing in other than a single tier and articles oriented at an undesired attitude.

Apparatus according to the invention and its manner of operation together with additional features, objects, and advantages thereof may best be understood from the following detailed description and the accompanying drawings wherein.

Figure 1:
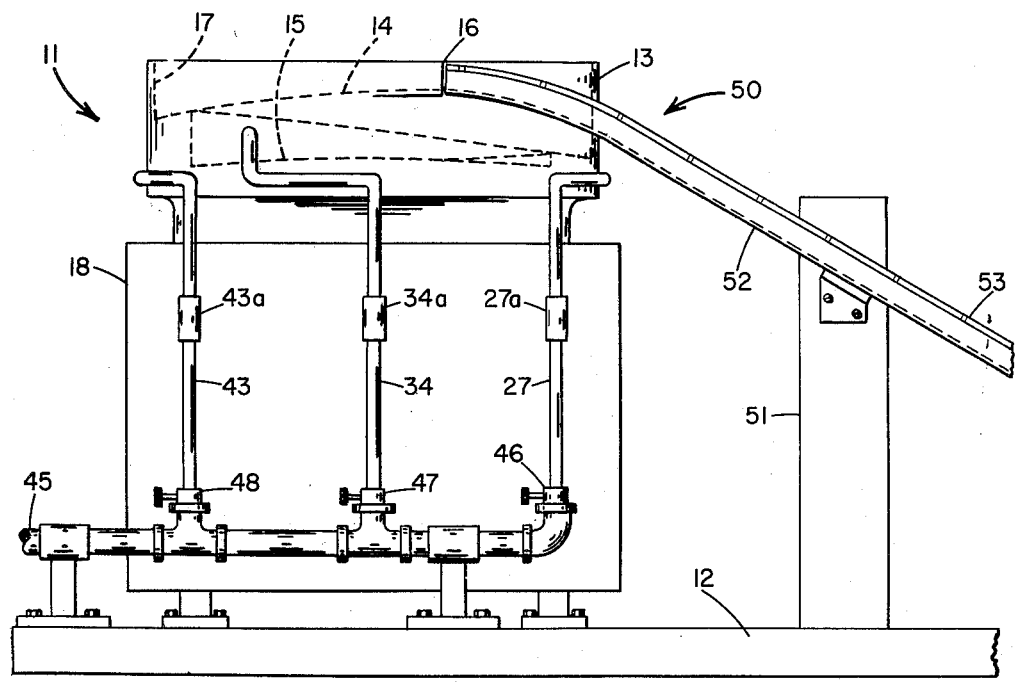
FIG. 1 is an elevational view of vibratory feeding apparatus according to the invention.
Figure 3:
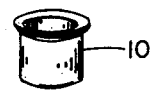
Figure 2:
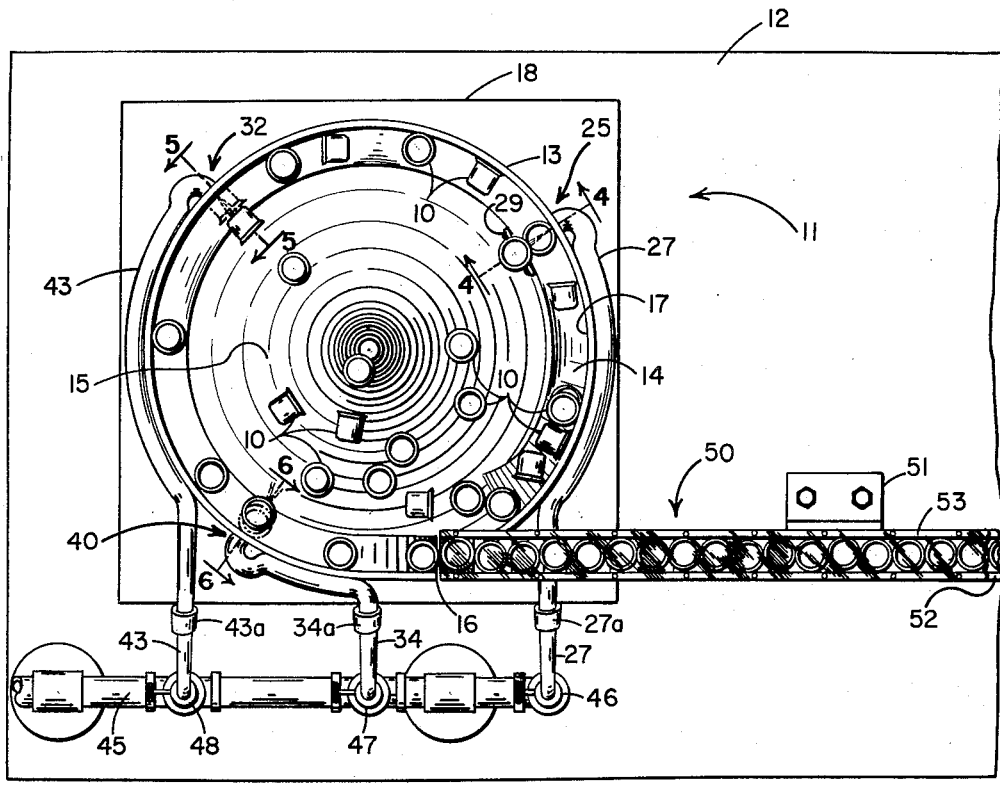
FIG. 2 is a plan view of the apparatus of FIG. 1.
Figure 4:
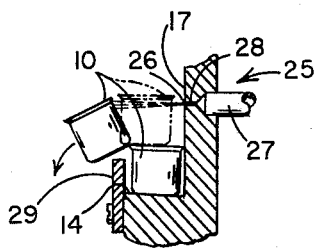
Figure 5:
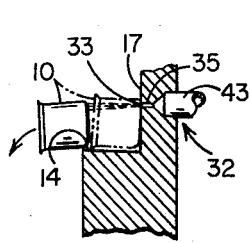
Figure 6:
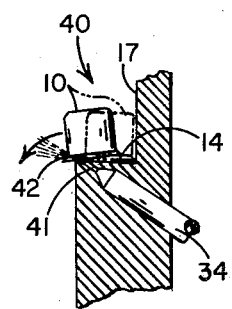

FIG. 3 is a perspective view of the cup-shaped article to be fed and oriented by the particular apparatus of FIGS. 1 and 2; and FIGS. 4, 5, and 6 are views partially in cross-section of portions of the apparatus of FIGS. 1 and 2 taken along lines 4—4, 5—5, and 6—6, respectively, of FIG. 2 and showing details of the pneumatic means employed for removing undesired articles from the track.

The apparatus shown in FIGS. 1 and 2 includes a vibratory bowl feeder 11 of well-known type mounted on a base plate 12. The bowl 13 into which the articles to be fed are placed in bulk has a spiral ramp 14 forming an inclined peripheral feed track which starts at the floor 15 of the bowl and ascends in a helical path toward a discharge point 16 near the top of the bowl. The floor of the bowl slopes slightly downward from the center toward the wall 17, and the track is flat but also slopes slightly toward the wall. The bowl is vibrated or agitated back and forth about a vertical axis by appropriate oscillating action provided by the driving mechanism 18 on which the bowl is mounted. Circulatory movement is imparted to the articles in the bowl by the oscillating action, and the articles tend to move outwardly and in a counter clockwise direction; thus being advanced around the bowl and up the ramp to the discharge point. The oscillatory action is adjusted so as to best achieve the proper movement of articles. The vibratory feeder device as hereinabove described is a readily available commercial product, the details and operation of which are well known.

A specific configuration of cup-shaped article 10 which may be fed and oriented by the improved apparatus shown and described herein is shown in FIG. 3. This article is essentially a hollow cylinder having a diameter greater than its height. It is closed at one end and open at the other end. A quantity of the articles is placed in bulk in the reservoir portion of the bowl in random or jumbled distribution. The apparatus is arranged to deliver the articles at the discharge point oriented with the open ends up.

As may be seen from FIG. 2, or FIGS. 4, 5, or 6, the width of the ramp 14 throughout the greater part of its length is approximately the same as the diameter of the articles to be fed. Thus, the articles are able to advance up the ramp in a single file only, any excess or overage falling back into the reservoir portion of the bowl.

As the articles advance along the track in single file they move by a first station 25 which may best be seen in FIG. 4. At this station a small aperture 26 is located in the wall of the bowl at a height above the ramp greater than the diameter of the article but less than twice the height of the article. Air under pressure passes from an air line 27 through a horizontal passage 28 and out the aperture or orifice. The air stream forms a barrier across the ramp and impinges on articles riding on top of other articles in the manner shown in FIG. 4. A retaining plate 29 which is located on the side of the ramp opposite from the aperture extends above the ramp to just below the height of the article and prevents articles on the ramp from being forced off the ramp while any tiered articles are blown off into the reservoir of the bowl by the air stream. The first station thus serves as an overage station for removing from the ramp all articles except those supported directly on the track and advancing by the station in a single tier.

A second station 32 as best shown in FIG. 5 is positioned farther along the ramp. At this station an aperture 33 is located in the wall of the bowl at a height above the ramp greater than the height of the article but less than the diameter of the article. Air from an air line 43 passes through a horizontal passage 35 leading to the aperture and impinges on each article being supported on its side, whether the open end is towards the wall, away from the wall, toward the direction of movement, or away from the direction of movement. Agitation of the articles by the action of the vibratory bowl minimizes the frictional forces between the articles and the ramp which must be overcome by the air jets in forcing articles back into the bowl. The air stream at the second station thus readily removes from the ramp all articles resting on their sides, or all articles passing this station in their movement up the ramp except those oriented with their open ends either up or down.

As the articles advance farther up the ramp they move by another orienting station 40 as best shown in FIG. 6. A passage 41 having an orifice 42 is positioned to direct a stream of air from an air line 34 upwards at an angle from the floor of the ramp. The orifice is at a distance from the wall of the ramp slightly less than the diameter of the article. The air passage which directs the air stream forms an angle of about 30° with the horizontal. Since the orifice is at least partially under articles advancing by the station, a portion of the air stream strikes against the inside surfaces of articles which have their open ends down, thus forcing them off the ramp and back into the reservoir portion of the bowl. An article which is advancing by the station in the open end up attitude is also struck by the air stream, but the air pressure against the edge of the closed end tends merely to tip the article upward toward the wall and deflect the air stream. Thus there is no component of pneumatic force on any portion of the article to cause it to be removed from the track. This last station thus removes from the ramp all articles passing by it except those oriented with their open ends upward.

The air lines 27, 34, and 43 which are connected to the air passages at the respective rejection stations are connected to an air manifold 45 through valves 46, 47, and 48, respectively. Short sections of rubber or other flexible tubing 27a, 34a and 43a are included in the air lines 27, 34 and 43 to isolate the manifold from the vibration of the feeder bowl. In feeding cup shaped articles having a diameter of approximately 5/16 inch and a height of approximately 1/4 inch an air pressure of about 5 pounds per square inch is supplied to the air passages each of which has a diameter of about .052 inch.

An article discharge chute 50 is attached to the base plate 12 of the apparatus by means of a bracket 51. The upper end of the chute is positioned closely adjacent the discharge point 16 of the bowl and acts as a continuation of the track. However it is not connected to the bowl and does not vibrate with it. The chute includes a trough-shaped member 52 covered with a sheet of transparent plastic material 53. The dimensions of the chute are such as to accommodate the articles and permit gravity flow and also prevent the articles from tumbling or jamming. After they have passed the last orienting station, the properly oriented articles are presented at the discharge point of the feeder bowl and then pass down the discharge chute to a processing mechanism or other apparatus located at the output end of the chute.

The apparatus hereinabove described provides for feeding cup-shaped articles from a bulk or random arrangement and presenting them one at a time oriented at a predetermined attitude at a discharge point for further processing. The desired orientation of the articles is accomplished by pneumatic means utilizing jets of air for preventing improperly oriented articles from reaching the discharge point. Orientation of the articles is achieved without complicated arrangements of gates, cams, stops, guides, and other mechanical orienting contrivances. Although apparatus which is particularly useful for feeding and orienting a particular configuration of cup-shaped article has been shown and described in detail, extension of the teachings herein to apparatus for feeding and orienting articles of other configurations may be readily accomplished.

What is claimed is:

1. Apparatus for feeding cup-shaped articles, each of which has a diameter greater than its height, along a path and presenting them sequentially and oriented open end up at a location, said apparatus including a track determining said path, vibratory means for oscillating said track so as to induce movement of the articles along the track toward said location, a portion of said track having a width of approximately the diameter of said articles whereby the articles are advanced in single file, a first rejection means including means for directing a fluid stream across said track at a height above said track greater than the height of one article but less than the height of two articles whereby all the advancing articles except those supported directly on the track are removed from the track, a second rejection means including means for directing a fluid stream across said track at a height above said track greater than the height of an article but less than the diameter of an article whereby only the advancing articles supported on their sides are removed from the track, and a third rejection means including means for directing a fluid stream across a portion of said track for impinging on the end of said advancing articles resting on the track whereby only articles having the open end downward are removed from the track.

2. Vibratory feeding apparatus for feeding or orienting small cup-shaped articles of height less than diameter including a bowl having a reservoir for a bulk supply of said articles in random distribution, a spiral ramp formed about the internal wall of said bowl leading from said reservoir and along which said articles are caused to ascend to a discharge point by the vibratory action of said feeding apparatus, a portion of said ramp having a width of approximately the diameter of said articles whereby all the ascending articles are advanced in single file, means for directing a first stream of said air across said ramp at a height above said ramp greater than the height of one article but less than the height of two articles whereby all the ascending articles except those in a single tier are removed from the ramp, means for directing a second stream of air across said ramp at a height above said ramp greater than the height of an article but less than the diameter of an article whereby only the advancing articles supported on their sides are removed from the ramp, and means for directing a third stream of air from the floor of said ramp across a portion of the ramp for impinging on the end of said ascending articles adjacent the ramp whereby articles having the open end downward are removed from the track.

3. Vibratory feeding apparatus for feeding and orienting small cup-shaped articles of height less than diameter including a reservoir for a supply of cup-shaped articles in random distribution, a spiral ramp formed about the internal wall of said feeding apparatus leading from said reservoir and along which said articles are caused to advance to a discharge point by the vibratory action of said feeding apparatus; a portion of said ramp having a width of approximately the diameter of an article whereby all the articles are advanced in single file; a series of pneumatic rejection stations located along the ramp; a first of said rejection stations including a first horizontal passage through said wall terminating in a first orifice in the internal surface of said wall at a height above said ramp greater than the height of one article but less than the height of two articles, a retaining plate positioned at the side of the ramp opposite from said first orifice and extending above the floor of the ramp to a height less than the height of an article, and means for introducing air under pressure into said first passage and through said first orifice whereby a stream of air is directed across said ramp for removing from the ramp all articles advancing by said first station except those resting directly on the ramp; a second of said rejection stations located along the ramp beyond the first station and including a second horizontal passage through the wall terminating in a second orifice in the internal surface of the wall at a height above said ramp greater than the height of an article but less than the diameter of an article, and means for introducing air under pressure into said second passage and through said second orifice whereby a stream of air is directed across said ramp for removing from the ramp all articles advancing by said second station supported on their sides; a third of said rejection stations located along the ramp beyond the second station and including a third passage through the wall terminating in a third orifice in the floor of said ramp at a distance from the wall less than the diameter of an article, and means for introducing air under pressure into said third passage and through said third orifice, said passage lying at an angle to the floor of said ramp whereby a stream of air from said third orifice is directed across a portion of said ramp for removing from the ramp all articles advancing by said second station having their open ends down.

4. Apparatus for feeding articles along a path and presenting them one at a time oriented at a predetermined attitude at a location, each article being capable of being fed along the path while oriented at any one of a plurality of attitudes including said predetermined attitude, said apparatus including a track adapted to be oscillated to advance the articles therealong toward the location, an overage means for removing from the track all the advancing articles except those advancing in a single file and in a single tier, a first rejection means including means for directing a fluid stream across a portion of said track for removing from the track all articles advancing by said first rejection means oriented at one attitude which differs from the predetermined attitude, and a second rejection means including means for directing a fluid stream across a portion of said track for removing from the track all articles advancing by said second rejection means oriented at another attitude which differs from said one attitude and from said predetermined attitude.

References Cited in the file of this patent

UNITED STATES PATENTS

| | | |
|---|---|---|
| 2,609,914 | Balsiger et al. | Sept. 9, 1952 |
| 2,765,900 | Seabrooke | Oct. 9, 1956 |
| 2,867,313 | Deshaw et al. | Jan. 6, 1959 |